C. E. WHITE.
CULTIVATOR FOR BEETS AND SIMILAR PLANTS.
APPLICATION FILED APR. 1, 1918.
1,324,187.
Patented Dec. 9, 1919.
3 SHEETS—SHEET 1.
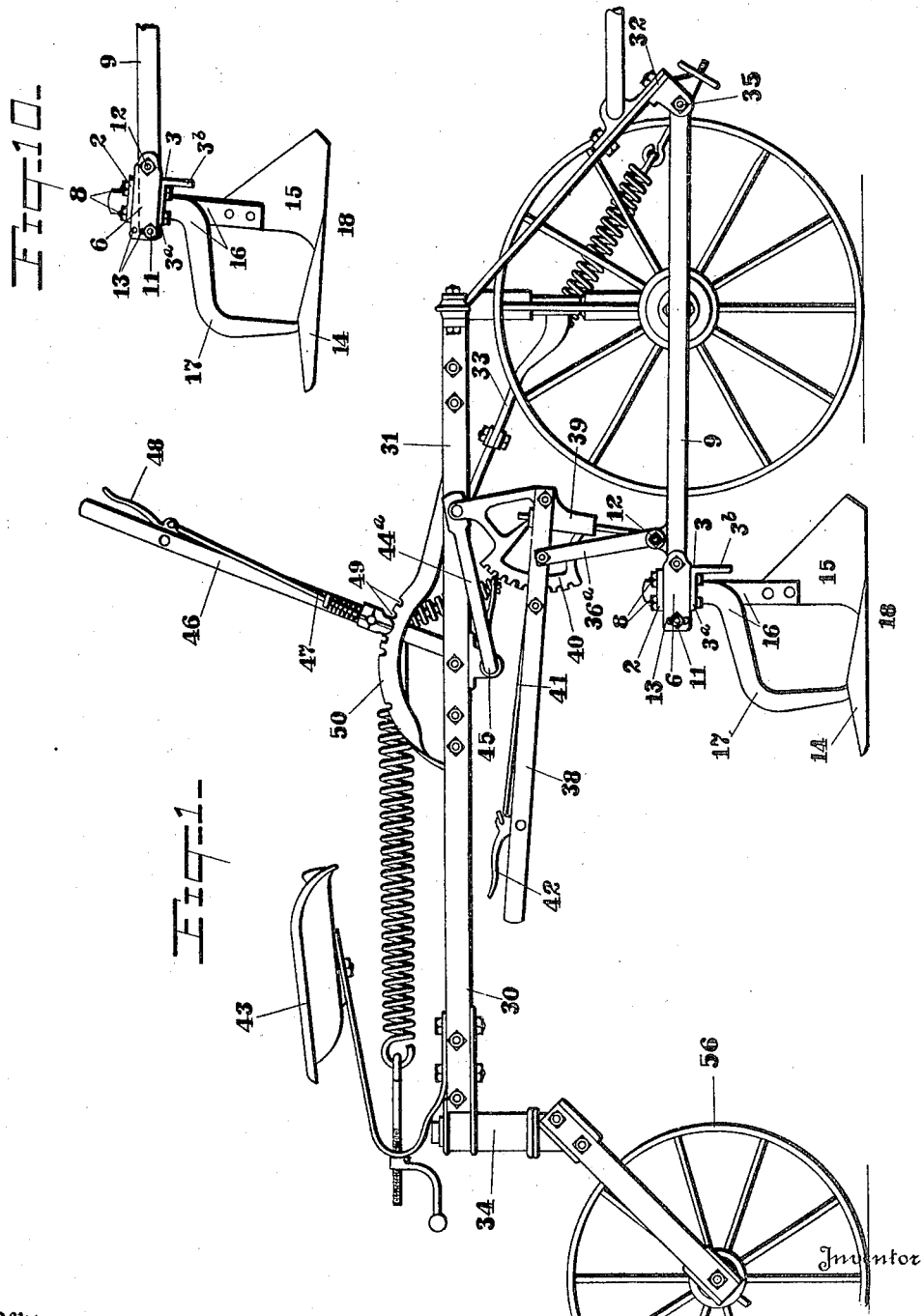

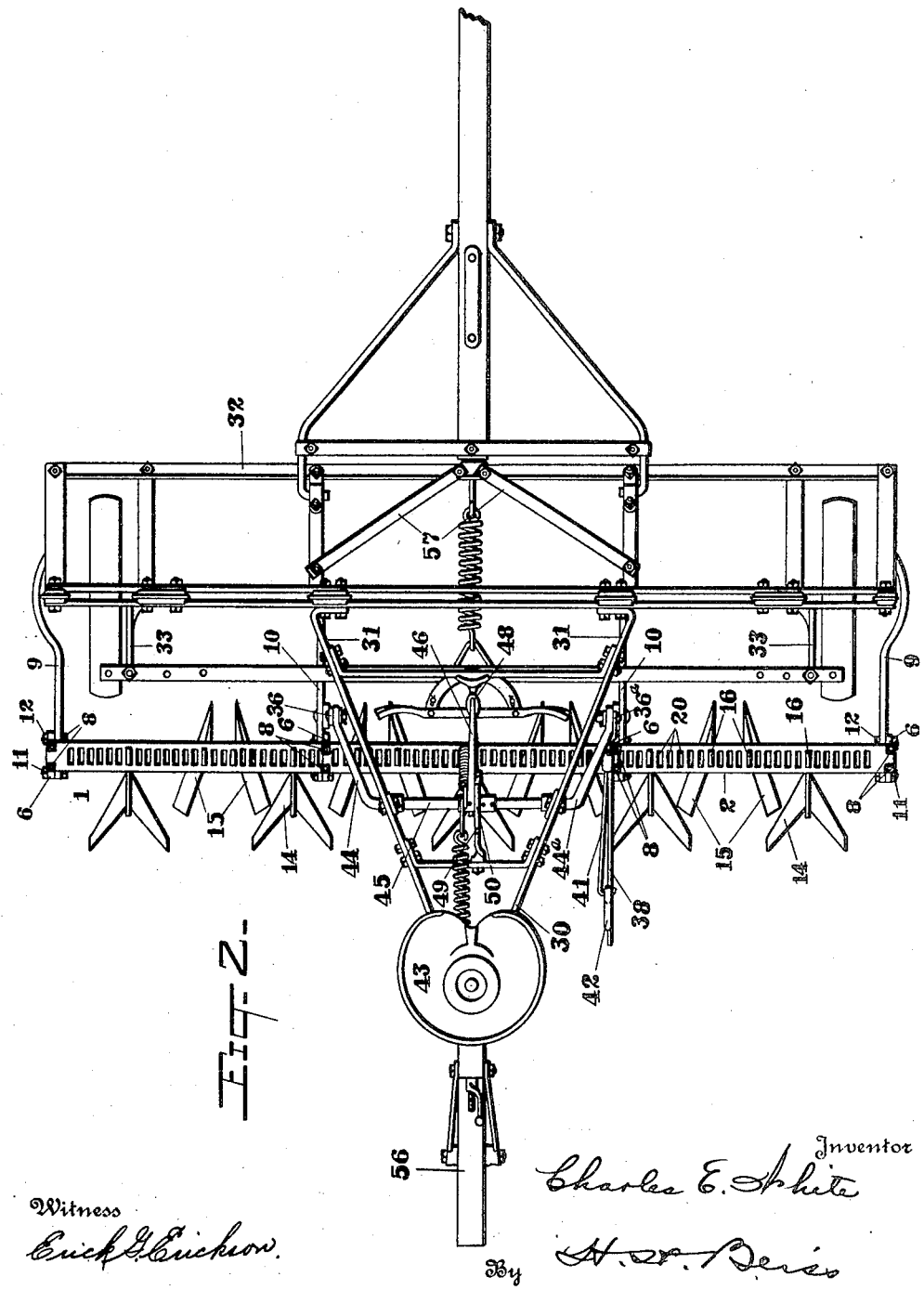

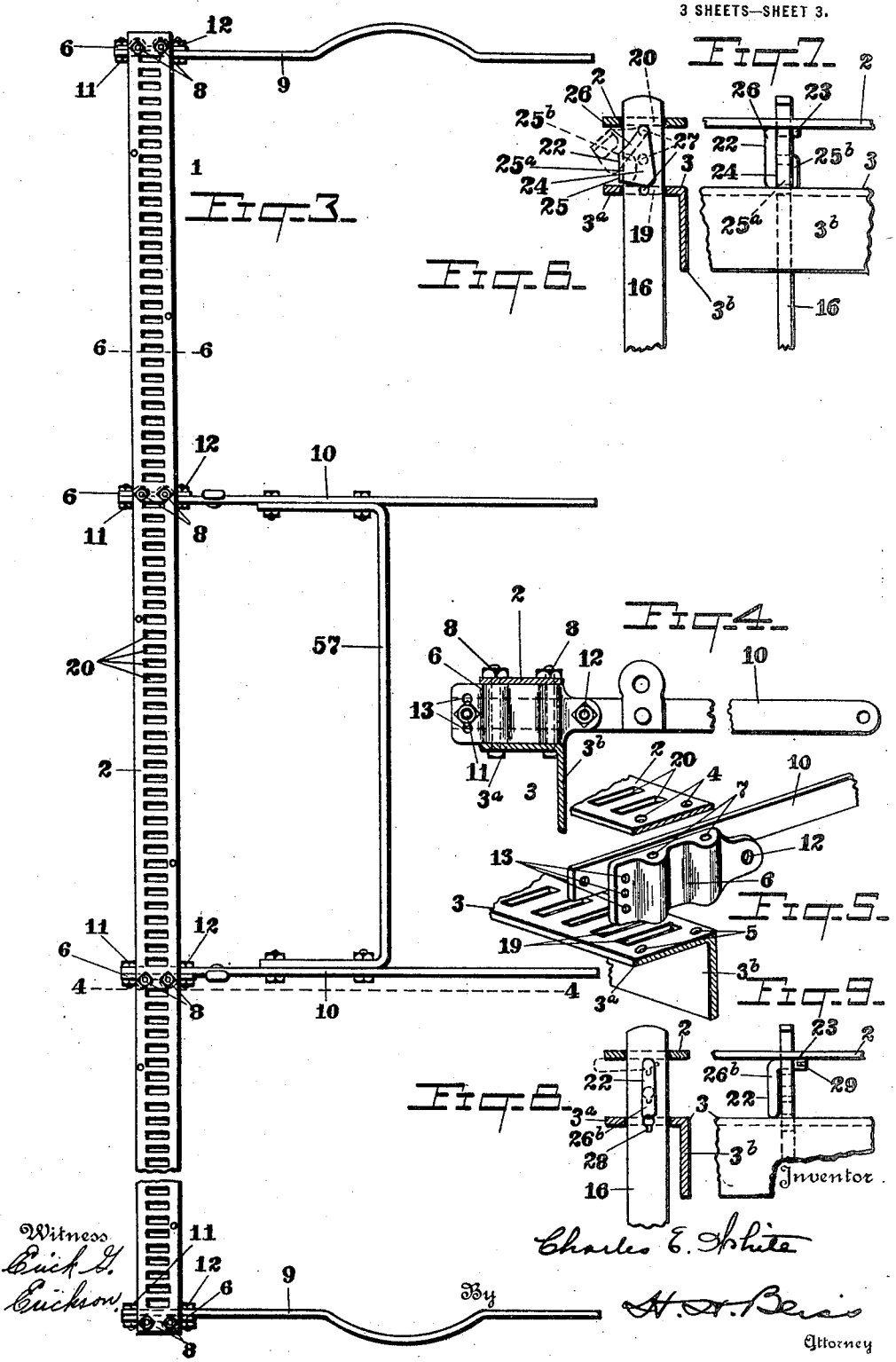

UNITED STATES PATENT OFFICE.

CHARLES E. WHITE, OF MOLINE, ILLINOIS, ASSIGNOR TO DEERE & COMPANY, OF MOLINE, ILLINOIS, A CORPORATION OF ILLINOIS.

CULTIVATOR FOR BEETS AND SIMILAR PLANTS.

1,324,187.    Specification of Letters Patent.    Patented Dec. 9, 1919.

Application filed April 1, 1918. Serial No. 226,018.

*To all whom it may concern:*

Be it known that I, CHARLES E. WHITE, a citizen of the United States, residing at Moline, in the county of Rock Island and State of Illinois, have invented certain new and useful Improvements in Cultivators for Beets and Similar Plants, of which the following is a specification, reference being had therein to the accompanying drawing.

This invention relates to improvements in cultivator implements; particularly to improvements in cultivators of the sub-class, which includes those that are designed for cultivating small plants that grow in rows which are spaced apart at varying distances to correspond with greatly varying conditions of the earth's surface in the fields where the plants are growing. Beets are plants which typify those that are more particularly referred to. In some fields the rows are relatively closer together or farther apart than are the rows of the beets, or similar plants, of the same sort in immediately neighboring fields; even in one section of a field the distances between the rows may vary from the distances between the rows in closely adjacent sections. Again, the rows, even those in a given field, are seldom uniformly spaced apart over the entire field, whether the spacing distances are short or long; that is to say, the surface soil may be such that a series of two or more rows will be relatively close together and then will occur relatively wide spaces before the next adjacent sets of rows are reached. Hence, the earth working tools, the implement as an entirety and its tool-carrying parts must be so constructed and related that it will be possible to easily, quickly, and frequently loosen the tools in their carrier, shift them, readjust them, and again tightly fasten them in their carriers in new positions relatively to the lines of advance of the implement.

Again, economy in the work of cultivation requires that a large area of the ground should be covered by the implement at each of its traverses across the field. This necessitates the use of a tool carrier which is considerably elongated, and which, as above indicated, must be prepared to have the tools quickly attached to it and detached from it at any point in a series of closely spaced points along the entire length of the carrier. This elongated carrier must be light, and yet strongly constructed so that it will, although light, permanently retain its straightness and resist sagging and bending from torsional strains.

Figure 1 is a side elevation of a beet cultivating implement embodying my improvements.

Fig. 2 is a top plan view of the same.

Fig. 3 is a top plan view of the tool carrier on a larger scale and detached from the rest of the implement.

Fig. 4 is a cross-section on the line 4—4 of Fig. 3.

Fig. 5 is a perspective showing the relations of the parts at the place where one of the drawbars is attached.

Fig. 6 is a cross-section on the line 6—6 of Fig. 3.

Fig. 7 shows a modified tool locking device, the tool shank being shown in edge view.

Fig. 8 illustrates, in side view, the devices shown in Fig. 7.

Fig. 9 is an edge view of the devices in Fig. 8.

Fig. 10 shows the tool bar and tools adjusted from the positions shown in Fig. 1.

In order that the manner of using the devices which more particularly relate to my invention, and their relations to the other parts of one of the implements as an entirety, may be readily understood, I have shown a beet cultivator as having them attached to or mounted thereon.

In the drawings, 1 indicates, as an entirety, the carrier to which the tools are attached. The implement illustrated is designed to cultivate four rows of beet plants, having regard to the total width of ground space (even the extreme width) ordinarily covered by that number of rows. The tool carrier must be adapted to support tools along a line of the length of 100 inches, more or less. That is to say, the carrier itself must frequently be from 8 to 9 feet long and arranged transversely of the machine. It is so made that a tool can be attached at any one of a large number of points generally from 96 to 110 along its entire length. I construct it of two light, wrought metal bars, the upper one being indicated by 2 and the lower one by 3. These are each integral from end to end and are elongated, as above described, to be 8 or 9 feet long. In the upper bar are formed numerous closely positioned, equally spaced, toolshank apertures, 20, in a series extended longitudinally from end to end of the bar, these apertures being rapidly punched through the metal at the shops in such way as to reduce to the minimum this matter of forming perforations.

The lower bar, 3, is formed of a rolled wrought metal L-shaped bar, the vertical flange, $3^b$, of which is turned downward to project away from the upper bar, 2, and the horizontal flange, $3^a$, of which is provided with tool shank apertures, 19, similar to those in the upper bar, 2, both in dimensions and in relative positions. These bars are, at their ends and at intervals, at two or more intermediate points, fastened rigidly together and are braced and spaced by devices indicated at 6, detachably, but firmly, fastened to them.

Vertical apertures, 4, are formed in the upper bar, 2, at the ends and at intermediate places, and similar and registering apertures, 5, are formed in the horizontal element, $3^a$, of the lower bar. Bracing and spacing devices, 6, have vertical apertures, 7, and are placed between the bars 2 and 3 and are firmly bound in position by bolts, 8, there being one of these spacing and binding devices at each end of the carrier and two or more of them at the intermediate places referred to, the four spacing blocks being approximately equidistant each from the next.

9 and 10 are drawbars connected to the carrier and extended forward therefrom, those at 9—9 being fastened to the ends and those at 10—10 being fastened at the aforesaid intermediate points. Each of the drawbars is connected to a bracing block and to the tool carrier by devices which permit the tool carrier to be rocked or adjusted around an axis longitudinally of the carrier so that the vertical lines through the apertures, 19 and 20, and the lines of the tool shanks can be angularly adjusted in relation to the drawbars. As shown, each drawbar is connected to a bracing block and to the carrier by a pivot, at 12, on the front side of the carrier and by an adjustable bolt or fastener, at 11, on the rear side. At 13 there is a series of bolt apertures through the spacing block, and the bolt, 11, can be placed in either one of these, the carrier being rocked in the proper direction to permit the bolt, 11, to pass through the selected aperture.

By turning the vertical flange $3^b$ of the lower bar, 3, downward, I retain the advantages incident to its presence, that is to say, I provide, with slight increase in metal and weight, a stiffener for the carrier from end to end, which prevents vertical sagging, to supplement the horizontal bar elements, $3^a$ and 2, which hold the carrier against bending forward or backward; and at the same time leave the spaces between the upper and lower bars, 2 and 3, and between the bracing and spacing devices, 6, entirely open on the front side and on the rear side of the carrier, thus making provision for passing the drawbars through the open space and for the operator inserting his hand from either side for the adjustment of the lock devices to be described.

The earth contacting elements or tools, proper, are indicated by 14 and 15. Each of these has a shank part, 16. This may be a bar which is vertical throughout or may be the upper vertical terminal part of a bar which is below then bent away from the vertical, as shown at 17, so that the earth working part of the tool, 18, can be supported at points in transverse vertical planes behind those of the carrying bar, 1.

The shank or stem, 16, of each tool is of such cross dimensions that it will snugly, but loosely, fit in both of the vertically alined apertures, 19 and 20, of a pair.

All of the exterior faces of the tool shanks are unbroken and continuous, having no indentations, notches, or recesses adapted to catch or engage with external objects, such as the edges of the metal around the apertures, 19 and 20. Consequently, as soon as a tool shank is unlocked it is ready to slip instantly up or down in its seat without requiring its being shifted in any direction to disengage it from either bar, 2 or 3.

The upper and lower bars of the carrier are utilized as part of the locking mechanism which prevents the displacement of the tools. In the shank, 16, of each of the tools, apertures, 27, are, at the shops, punched in a series near the upper end. And for each tool there is provided a small casting, which serves as the movable element of the tool-locking mechanism. It is indicated as an entirety by 22 and, as shown in Fig. 7, comprises a horizontal pin, 23, and a holder for the pin, having an enlarged weight mass, at 24, and a stop, 25, in the form of a lug or flange, $25^a$, attached to bear against the edge of a tool shank, and with a lip, $25^b$, adapted to fit against the side face of a shank. The length of the shank part, 26, of this lock casting is equal to the distance between the adjacent surfaces of the upper bar, 2, and the lower bar, 3, of the carrier. Normally when the pin, 23, is in one of the apertures, 27, the lower edge of the lock piece bears against the upper surface of the lower bar, 3, at a point in the vertical line of the pin, 23, and the upper side of the pin, 23, bears against the under surface of the upper bar, 2; and, consequently, the shank and its tool are locked firmly in position. The lock piece, 22, is, therefore, to be regarded, practically, as permanently in place on the carrier. Without the intervention of an operator's hand it is impossible to detach the lock piece unless the implement should be turned upside down.

With a carrier constructed in the way described, even though a large number of tools be attached thereto (13 tools as shown in Fig. 2), if locking devices such as set forth be provided it will be seen that the time and work required for loosening the tools, shifting them, and resetting them in new positions, are reduced to the minimum. To release one of them it is necessary for the operator to lift the lock to the position shown in dotted lines where it can instantly escape from the aperture 27 and he can then either move the tool up or down, for vertical adjustment, or can quickly slip it out of the apertures, 19 and 20, and re-insert it at other predetermined apertures, and then can as quickly reinsert and permit the lock to swing down into its operative position.

In Figs. 8 and 9 a modified form of the lock piece is shown. In order to prevent the lock device, 22, and its pin, 23, from unintended or accidental escape from the aperture, 27, while the tool carrier, 1, is in any ordinary position, I form the apertures and the pins as shown; that is to say, I provide each aperture with a narrow slot, 28, which communicates with it, and also form a ward lug, 29, on the pin, 23, the slot and ward being so angulated relative to the vertical line of the tool shank that it is necessary to rotate the lock to a very unusual position, as shown in dotted lines, to permit the pin to be withdrawn from the aperture. The shank part, 26$^b$, being in this case, made sufficiently long to provide for a binding action between its lower end and the upper surface of the lower bar 3. A tap or two from a hammer or stone will drive it into tight engagement with the bar or, vice versa, will release it therefrom to permit its detachment and the adjustment of the earth tool.

The inconvenience and cost incident to making the slots, 28, and the wards, 29, in devices like those in Figs. 6 and 7 can be obviated by making the lip, 25$^b$, long enough to require the swinging of the locking element, 22, to an unusual position before it can be moved axially of the pin, 23. This lip, 25$^b$, when in place holds the lock in position on the shank.

The devices above described are carried upon the frame elements of the implement illustrated in Figs. 1 and 2. 30 indicates a frame structure having the upper horizontal, centrally and longitudinally disposed, element, 31, the lower front, transversely extended section or element, 32, the supporting and adjusting element, 33, for the two widely separated front wheels, and a rear element, 34, for supporting the rear wheel, 56.

Each of the aforesaid bars, 9 and 10, extending forward from the tool carrier is pivoted, at 35, to the lower part of the front frame element, 32, and around the axis of these pivots the tool system as an entirety can be raised and lowered.

The tools and their carrier are suspended by links, 36, 36$^a$, which are connected to devices supported on the main frame.

45 is a rock shaft mounted on the frame and having crank arms 44, 44$^a$. The left-hand link, 36, is connected directly to the crank 44. The right-hand link, 36$^a$, is connected to the crank, 44$^a$, by an intervening adjusting mechanism. The latter comprises a lever, 38, to which link 36$^a$ is pivoted and the holder, 39, to which the lever is pivoted, and which, in turn, is pivoted to the crank, 44$^a$. The holder has a tooth like segment, 40, and the lever, 38, carries a detent, 41, and a controlling latch lever, 42, within reach of the operator when in his seat, 43. By means of these devices the right-hand end of the tool carrier can be raised or lowered relatively to the left-hand end without disturbing the devices which effect the general adjustment vertically. The latter adjustment is attained by the hand lever, 46, connected to the rock shaft, 45, and having a detent, at 47 (controlled by the latch lever, 48), arranged to engage the notches at 49 in a lock segment, 50. By these latter devices the adjustment vertically, of the entire tool carrying system of parts can be accomplished. Thereafter, if the conditions of the soil surface or other causes make it necessary to vary the angle of the longitudinal lines of the tool carrier relative to horizontal planes it can be done by the devices aforesaid controlled by the lever, 38.

The tool carrier, 1, being, as above described, remarkably long, considering farm implements is, even when made as light as possible, still of considerable weight, and as it projects long distances, laterally, beyond the points of suspension and support, devices become necessary for effecting adjustments such as described. The links 36, 36$^a$, are connected to the central part of the tool system through the rear ends of the intermediate drawbars, 10, and these, in order to make the suspension element of the tool frame as rigid as possible, are stiffly connected by one or more crossbars, 57, to distribute the strains.

This long, transversely arranged, tool carrier is positioned below the narrow central part, 31, of the frame, and in transverse lines as close as possible to the transverse vertical planes of the front wheels, the laterally elongated front section, 32, of the main frame being narrowed longitudinally of the machine and the tool carrier being arranged in transverse vertical planes as close as possible to the rear parallel planes of the front frame section.

And when the frame parts, the suspending devices, and the laterally elongated tool system are thus constructed and related the operator has perfect control of the carrier and of the tools and is positioned where he can observe closely the actions of all the parts.

The intermediate drawbars, 10, 10, being positioned, as described, substantially uniformly in relation to the central part of the long tool carrier and in relation to the central longitudinal lines of the machine, and being themselves spaced several feet apart to take care properly of the weight of the carriers and the forward and backward leverage of the end parts of the carrier when it is being adjusted, lifted or lowered. The outside drawbars 9 are connected to the carriers directly at its ends and properly hold its end sections and distribute the draft properly throughout the bar from the front part of the wheeled frame through the hinge devices at 35. The steering wheels at the front are arranged close to and directly in front of parts of the long tool carrier, and when they are turned, in steering the implement, the end parts of the tool system quickly respond to the change of direction without severe stresses or strains on the frame or tool system.

What I claim is:

1. In a cultivator of the class described, the combination of an elongated carrier extending as a unitary structure transversely of the machine from one side thereof to the other side and formed of two relatively thin light flat bars arranged flatwise horizontally one above the other and spaced apart vertically and provided with numerous tool shank apertures closely positioned along the longitudinal lines of said bars, bracing and spacing devices secured in positions between the said bars, a series of draw bars having their rear ends arranged vertically flatwise and positioned between the said tool carrier bars, and means for adjustably clamping the draw bars to the said spacing devices and to the tool carrier.

2. In a cultivator of the class described, an elongated tool carrier rotatable around a longitudinal axis from one position of adjustment to another and formed of an upper wrought metal bar provided with an extended series of numerous closely positioned apertures for tool shanks a lower separately formed L-shaped bar having its horizontal flange provided with tool shank apertures similar to those aforesaid and separable means for spacing, bracing and fastening together the said bars, drawbars extending forward from said carrier, and means for fastening the drawbars rigidly to the tool carrier in either of said positions of its adjustment.

3. In a cultivator of the class described, an elongated tool carrier formed of an upper wrought metal bar provided with numerous closely positioned tool shank apertures in a series extended longitudinally of the bar, a lower separately formed L-shaped bar having its horizontal flange provided with tool-shank apertures similar to those aforesaid, and separable means for spacing, bracing and rigidly fastening the said bars together, drawbars each connected by a pivot to a spacing and bracing device, and means for rigidly fastening the drawbar to the tool carrier in either of several positions around the pivot.

4. In a cultivator of the class described, an elongated tool carrier formed of an upper wrought metal bar provided with numerous closely positioned tool shank apertures in a series extended longitudinally of the bar, a lower separately formed wrought metal bar provided with a series of tool shank apertures, each alining vertically with an aperture in the upper bar, and means for spacing, bracing and fastening rigidly together the said bars, and locking devices positioned between the upper and the lower bars, one for each tool shank and normally engaging therewith positively and bearing against both said bars.

5. In a cultivator of the class described, an elongated tool carrier formed of an upper wrought metal bar provided with numerous closely positioned tool shank apertures in a series extended longitudinally of the bar, a lower separately formed wrought metal bar provided with a series of tool shank apertures, each alining vertically with an aperture in the upper bar, and means for spacing, bracing and fastening rigidly together the said bars, and locking devices in the space between the upper and lower bars normally positively engaging with the tool shanks and bearing upward and downward against the said bars, respectively.

6. In a cultivator of the class described, an elongated tool carrier formed of an upper wrought metal bar provided with numerous closely positioned tool shank apertures in a series extended longitudinally of the bar, a lower separately formed wrought metal bar provided with a series of tool shank apertures, each alining vertically with an aperture in the upper bar, and means for spacing, bracing and fastening rigidly together the said bars, a series of earth tools each having a shank provided with a series of apertures and adapted to be fitted in two alined apertures in the said bars, and locking devices each having a pivot normally held permanently in one of the said shank apertures and each bearing against the upper and lower bars to lock its shank in position.

7. In a cultivator of the class described, an elongated tool carrier formed of an upper wrought metal bar provided with numerous closely positioned tool shank apertures in a series extended longitudinally of the bar, a lower separately formed wrought metal bar provided with a series of tool shank apertures, each alining vertically with an aperture in the upper bar, and means for spacing, bracing and fastening rigidly together the said bars, and locking devices in the space between the said bars, normally positively engaging with the tool shanks and provided with weight masses for swinging them to and holding them in the positions where they lock the tool shanks.

8. In a cultivator of the class described, an elongated transversely arranged tool carrier formed of an upper wrought metal bar provided with numerous closely positioned tool shank apertures in a series extended longitudinally of the bar, a lower separately formed L-shaped bar having its vertical flange extending downward and having its horizontal flange provided with tool shank apertures, similar to those aforesaid, and separable means for spacing, bracing and rigidly fastening together the said bars, the spaces between the upper and lower bars and between the bracing and fastening devices being open in rear and in front, and locking devices for the tool shanks in the said spaces between the bars.

9. In a cultivator of the class described, the combination of the elongated tool carrier, the drawbars at the ends of the tool carrier, the drawbars intermediate of those aforesaid and connected to the central part of the tool carrier, the frame for supporting and propelling the tool carrier, means for hinging the front ends of both the outer and the intermediate drawbars to the front part of said frame, means for suspending the tool carrier connected to the intermediate drawbars, a vertically adjustable holder on the main frame for the suspending means, and devices for vertically adjusting the suspending means relatively to the said holder.

10. In a cultivator of the class described, the combination of the relatively elevated frame having a laterally elongated transversely positioned front section and a narrow central longitudinally arranged backward extending section, an elongated transversely arranged tool carrier behind the front transverse frame section and below the said backwardly extending central section and extending laterally to points remote from the last said frame section, a drawbar at each end of the tool carrier hinged to the end part of the front transverse frame section, intermediate drawbars connected to the central part of the tool carrier and hinged to the front frame section, a vertically adjustable holder for the tool carrier supported from the main frame and means for vertically adjusting the tool carrier in relation to said holder and adapted to hold the tools positively in predetermined horizontal planes of operation.

In testimony whereof I affix my signature.

CHARLES E. WHITE.